(12) United States Patent
Birkenbaugh

(10) Patent No.: US 6,889,994 B1
(45) Date of Patent: May 10, 2005

(54) TRAILER PULLING APPARATUS

(76) Inventor: Jason Birkenbaugh, 9360 SE. 10 Ave., Kingman, KS (US) 67068-8663

( * ) Notice: Subject to any disclaimer, the term of this patent is extended or adjusted under 35 U.S.C. 154(b) by 0 days.

(21) Appl. No.: 10/610,484

(22) Filed: Jun. 30, 2003

(51) Int. Cl.⁷ ............................................. B62D 53/00
(52) U.S. Cl. ................................. 280/491.2; 280/479.2
(58) Field of Search ............................ 280/491.2, 511, 280/407, 412, 482, 491.1, 479.2, 479.3

(56) References Cited

U.S. PATENT DOCUMENTS

| | | | | | |
|---|---|---|---|---|---|
| 2,929,643 A | * | 3/1960 | Merchant | ................. | 280/491.2 |
| 3,635,495 A | * | 1/1972 | Orendorff | ................. | 280/416.1 |
| 3,738,684 A | * | 6/1973 | Lusk | ................. | 280/491.1 |
| 3,979,133 A | * | 9/1976 | Morris | ................. | 280/42 |
| 4,175,768 A | * | 11/1979 | Thackray | ................. | 280/652 |
| 4,269,429 A | * | 5/1981 | Eichstadt | ................. | 280/503 |
| 4,603,878 A | * | 8/1986 | Smith, Jr. | ................. | 280/479.2 |
| 5,322,315 A | * | 6/1994 | Carsten | ................. | 280/479.2 |
| 5,895,066 A | * | 4/1999 | Headlee | ................. | 280/414.1 |
| 6,068,281 A | * | 5/2000 | Szczypski | ................. | 280/479.2 |
| 6,170,852 B1 | * | 1/2001 | Kimbrough | ................. | 280/479.2 |
| 6,502,845 B1 | * | 1/2003 | Van Vleet | ................. | 280/491.1 |

* cited by examiner

*Primary Examiner*—Lesley D. Morris
*Assistant Examiner*—Tony Winner
(74) *Attorney, Agent, or Firm*—Kenneth H. Jack; Davis & Jack, LLC

(57) ABSTRACT

A trailer pulling apparatus consisting of a quill having a bore and having an outer surface; a trailer mount fixedly attached to the outer surface of the quill; a tongue having forward and rearward ends, the tongue slidably extending through the bore of the quill; a hitch fixedly attached to the forward end of the tongue; and an automatically disengagable slide controlling spring latch connected operably to the quill and to the tongue, the spring latch automatically locking the tongue with respect to the quill upon successive rearward and forward motions of the tongue through the quill.

7 Claims, 4 Drawing Sheets

TRAILER PULLING APPARATUS

FIELD OF THE INVENTION

This invention relates to pulled trailers, carriages, wagons, and the like. More particularly, this invention relates to trailer tongues extending forwardly from such apparatus.

BACKGROUND OF THE INVENTION

A trailering vehicle such as, for example, a fifth wheel wagon, commonly has a forwardly extending tongue whose rearward end is fixedly and pivotally attached to such wagon's forward fifth wheel axle, and whose forward end comprises a trailer hitch, typically configured as a ball socket or as a hook engaging ring or eye. The lateral dimensions of the rearward end of a truck which pulls such wagon, and the forward end of such wagon commonly dictate the length of such tongue. Where such tongue has an insufficient length, and upon, for example, a sharp left turn, a "jack knife" may occur wherein the left front corner of such wagon undesirably comes into contact with the left rear corner of such truck. Accordingly, such tongues are lengthened so that such jack knifing contact is avoided upon sharp cornering. However, where the truck comprises a flatbed vehicle equipped with hay bale handling articulating arms, tongue lengthening needed to facilitate sharp cornering may displace the wagon so far rearwardly from the truck that the truck's articulating arms are unable to transfer hay bales from the bed of the truck to the wagon.

The instant inventive trailer pulling apparatus solves the above described problem by configuring a trailering tongue to include a quill and slide shaft assembly which is capable of alternately assuming trailering and bale off-loading positions.

BRIEF SUMMARY OF THE INVENTION

A primary structural component of the instant inventive trailer pulling apparatus comprises a quill having a hollow bore. Preferably, the quill comprises a length of structural square steel tubing. Trailer mounting means fixedly attached to the quill are necessarily provided, such means preferably comprising a pivotal attachment to a fifth wheel axle of a fifth wheel trailer. Suitably, where the trailer pulling apparatus is to be used in conjunction with a single axle trailer, or in conjunction with a trailer having a single gang of axles, the trailer mounting means may comprise a fixed weldment of the quill to the forward end of such trailer.

Necessarily, a sliding tongue is telescopingly mounted within the bore of the quill, the sliding tongue preferably comprising a smaller gauged length of structural steel having a square cross-section, the outer cross-sectional dimensions of the sliding tongue preferably closely matching the inner cross-sectional dimensions of the bore of the quill.

Slide controlling means fixedly attached to the quill or formed wholly with the quill are necessarily provided, such means being adapted for alternately and selectively holding the slide tongue at a forwardly extended position, and permitting movement to a rearwardly retracted position. Suitably, commonly known slide stopping means such as shear pin and eye combinations, slide stopping collars, slide stopping moveable cogs and the like may be utilized for controlling forward extension and rearward retraction of the slide tongue. However, preferably, the requisite slide controlling means comprises a shear pin guiding bracket which is fixedly attached to the quill, such bracket supporting and guiding spring biased motion of a shear pin. Preferably, the shear pin is moveable between a first position wherein the shear pin extends into and through aligned pin receiving apertures within the quill and forwardly extended tongue, and a second position wherein the shear pin is outwardly withdrawn from such first position.

The shear pin and shear pin guiding bracket preferably comprise a pin latch which spans between the bracket and the shear pin, and which is adapted for selectively holding the shear pin in its withdrawn second position. Also preferably, pin releasing means in the form of a bar or plate fixedly attached to the forward end of the sliding tongue is positioned to disengage such latch upon rearward retraction of the slide tongue.

In operation of the instant inventive trailer pulling apparatus, a hay bale carrying flat bed truck which is equipped with bale carrying articulating arms, and which is equipped with a rear ball hitch, may be provided. Preferably, the forward end of the slide tongue of the instant invention is provided with a ball socket hitch, an eye hitch, or a clevis hitch. Such hitch may be securely attached to such truck's rear trailer hitch. Upon manipulating the slide tongue and the shear pin to assure that the shear pin extends through aligned apertures within the quill and the slide tongue, the inventive trailer pulling apparatus is configured in a trailering configuration. In such trailering configuration the effective length of the apparatus is preferably sufficient to prevent undesirable "jack knifing" upon sharp cornering.

Where a next operation of transferring a hay bale from the load bed of such truck onto a wagon or trailer pulled by such truck is to be executed, the shear pin is withdrawn from the slide tongue's and the quill's aligned apertures, and the pin latch is actuated to hold the shear pin in such withdrawn position. Thereafter, the truck may be backed toward the trailer or wagon, the backing motion slidably rearwardly moving the slide tongue through the bore of the quill until such tongue's forward pin releasing bar or plate disengages the pin latch. Upon disengagement of the pin latch, the shear pin is biased by the biasing spring through the quill's aperture to rest upon an outer surface of the slide tongue. Thereafter, upon completion of hay bale transfers from the bed of the truck to the trailered wagon, the truck may be driven forwardly, causing the slide tongue to slidably move forwardly through the bore of the quill. Upon realignment of the slide tongue's pin receiving aperture with the quill's pin receiving aperture, the shear pin biasing spring automatically further drives the shear pin into the slide tongue's shear pin receiving aperture, automatically locking the slide tongue in its forwardly extended trailering position.

Accordingly, objects of the present invention include the provision of a trailer pulling apparatus comprising an extendable and retractable quill and slide tongue assembly, such assembly incorporating means for selectively releasing the slide tongue for rearward sliding retraction, and for automatically locking the slide tongue in place with respect to the quill upon forward extension of the slide tongue.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
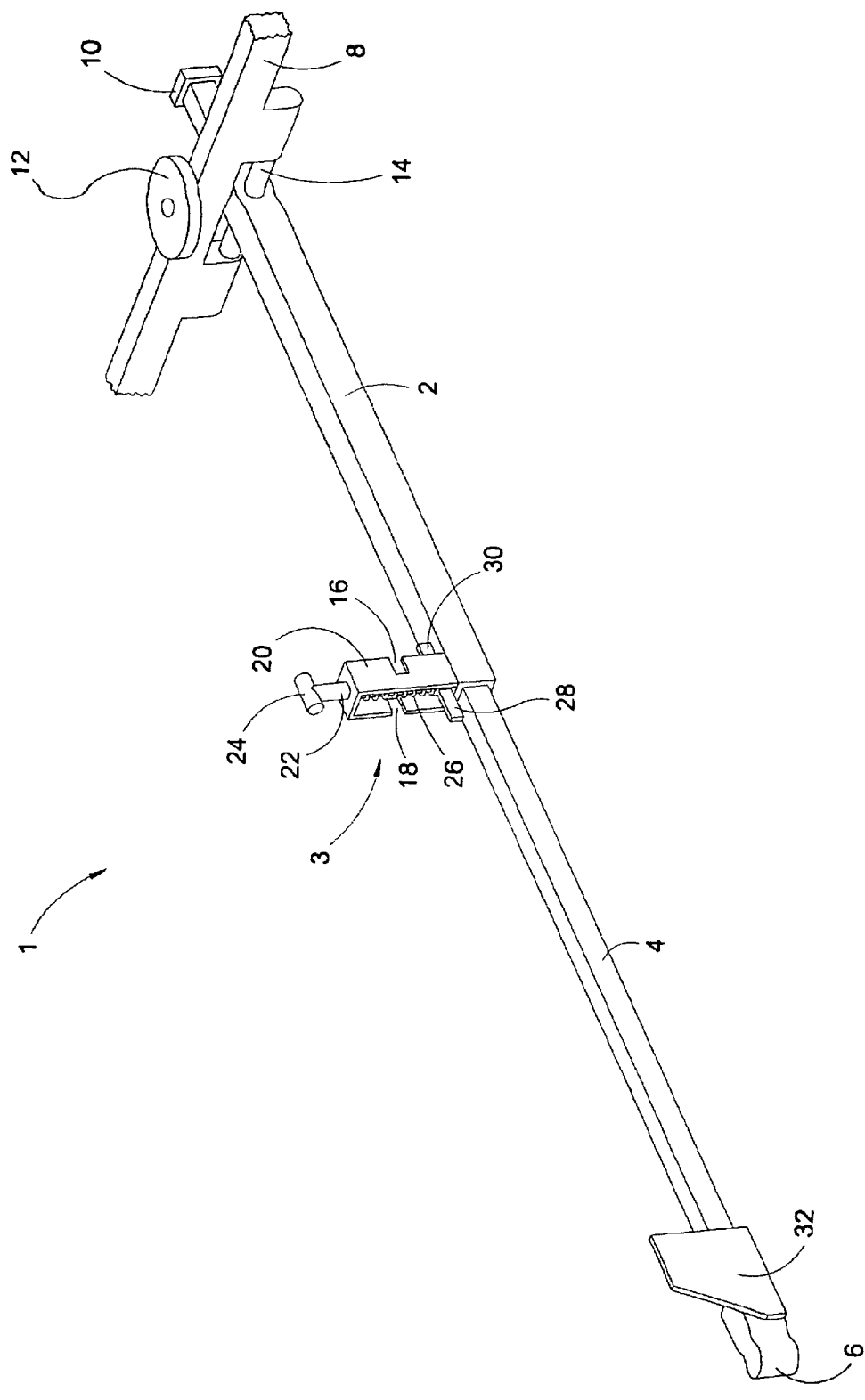
FIG. 1 is an isometric view of the instant inventive trailer pulling apparatus.

Referring now to the drawings, and in particular to FIG. 1, the instant inventive trailer pulling apparatus is referred to generally by Reference Arrow 1. The apparatus 1 comprises a hollow bored quill 2 having a spring biased shear pin controlling assembly 3 fixedly attached to its forward end, and having trailer attaching means, preferably a fifth wheel assembly comprising fifth wheel axle 8, fifth wheel pivot 12, and vertical pivot 14, fixedly attached to its rearward end.

Figure 3:
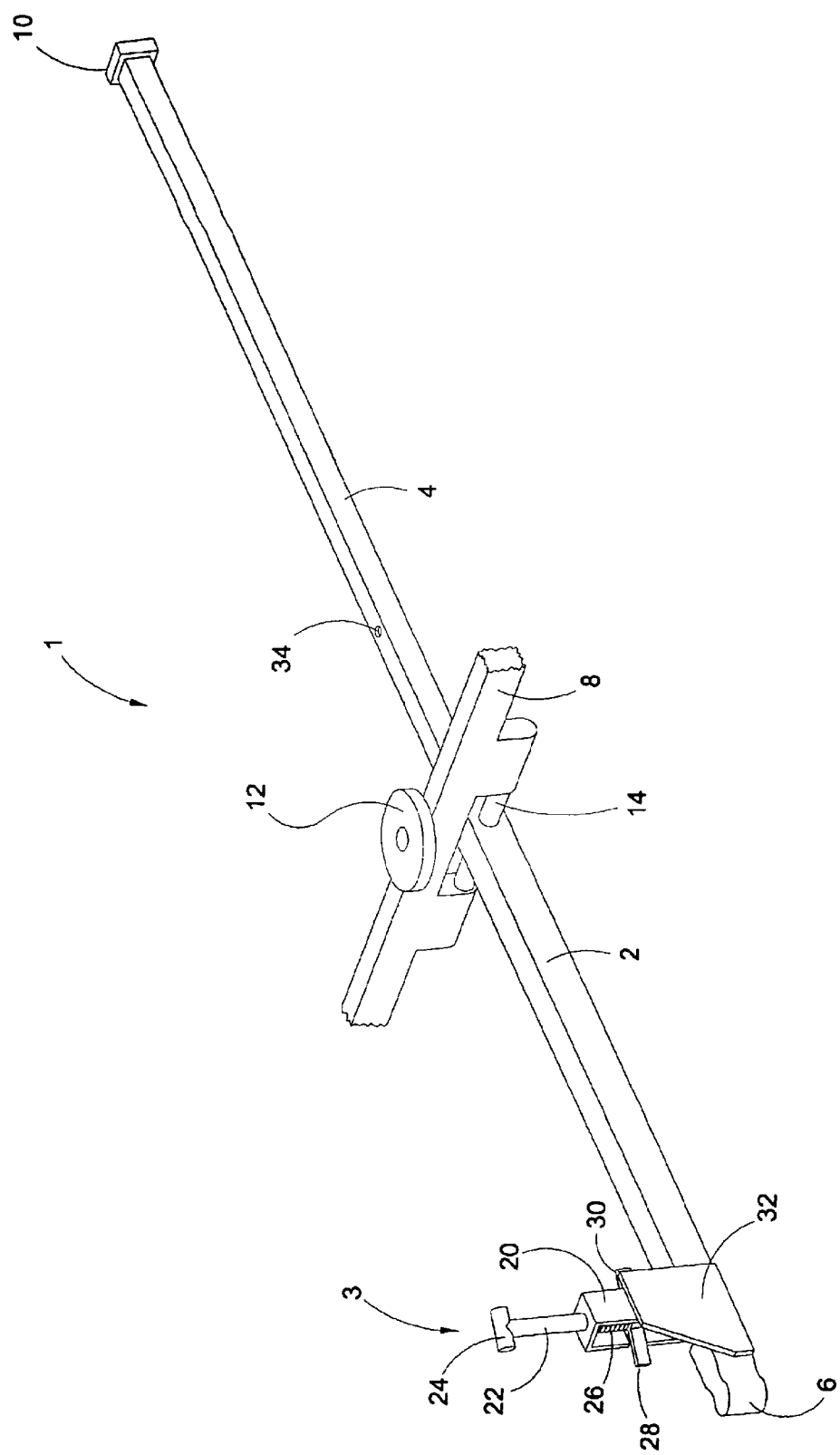
FIG. 3 redepicts FIG. 1, showing the trailer pulling apparatus in a second alternate configuration.

Referring further to FIG. 1, a sliding tongue 4 is mounted within the bore of the quill 2, the rearward end of the sliding tongue 4 having a slide stop 10 fixedly attached thereto, and the forward end of the slide tongue 4 having a trailer hitch 6, representative of ball socket, eye, and clevis hitches, and having a latch disengaging plate 32 fixedly attached thereto. Referring simultaneously to FIGS. 1 and 3, the sliding tongue 4 preferably further has a shear pin receiving aperture 34 extending vertically therethrough.

Referring further to FIG. 1, a shear pin guiding bracket 20 is fixedly attached to the forward end of the quill 2, and a shear pin 22 is retained by and is slidably mounted within bracket 20. Preferably, the shear pin 22 supports outwardly extending pin latching arms 28 and 30, such arms being engagable with bracket slots 18 and 16. Also preferably, the shear pin 22 axially extends through and is downwardly biased by spring 26, the spring 26 spanning between the ceiling of bracket 20 and upper surfaces of latch arms 28 and 30.

Referring simultaneously to FIGS. 1 and 3, while the shear pin 22 is downwardly positioned as depicted in FIG. 1, the lower end of the shear pin 22 extends through apertures within quill 2 (such apertures not within view), and simultaneously extends through aperture 34 within slide tongue 4, such downward extension of shear pin 22 operating to lock the slide tongue 4 in its forwardly extended position described in FIG. 1. While the trailer pulling apparatus 1 is configured as depicted in FIG. 1, spring 26 continues to function to secure the shear pin 22 in its downwardly extended and locked position, preventing the shear pin 22 from undesirably releasing upon experiencing vibration of road travel.

Figure 2:
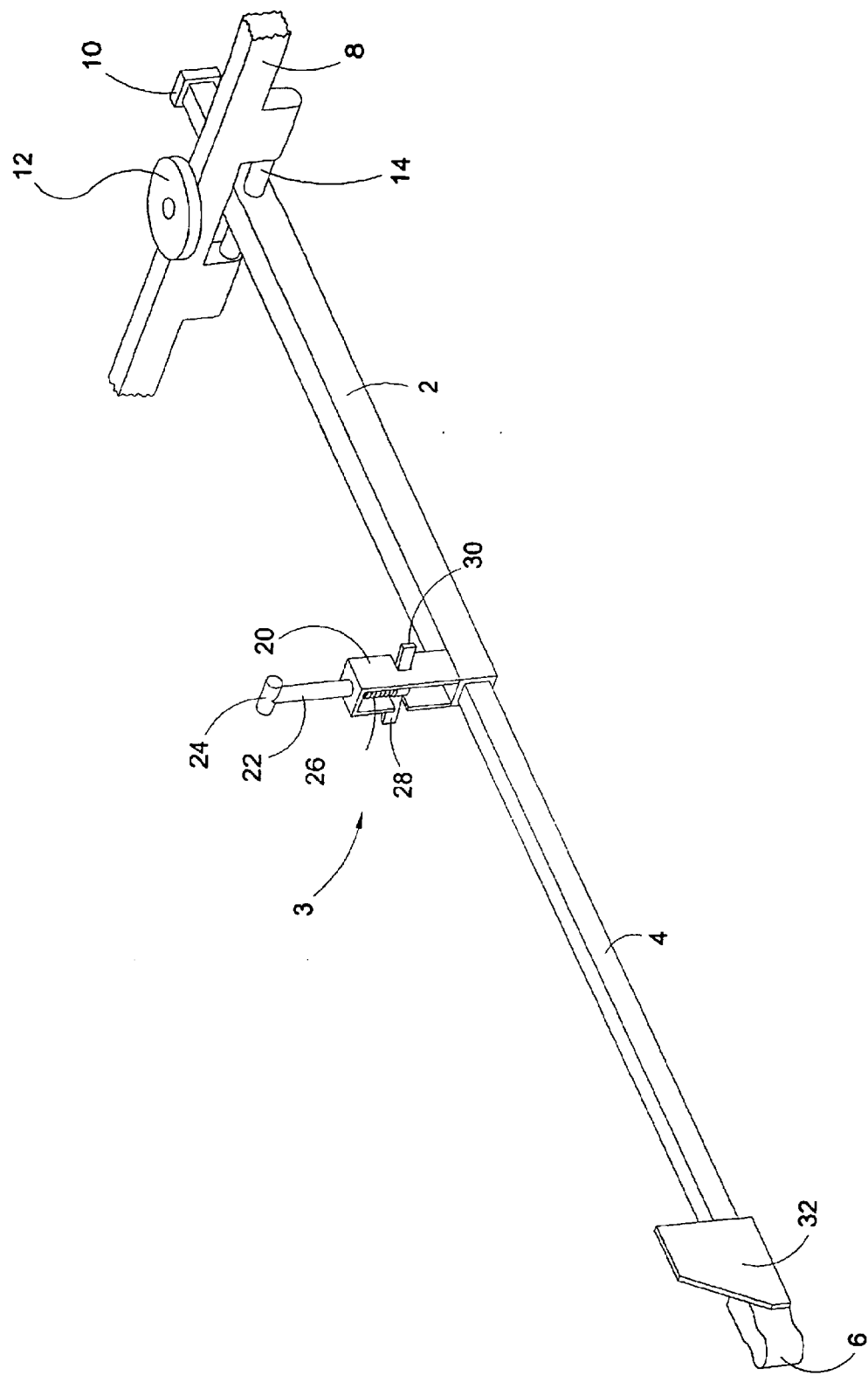
FIG. 2 redepicts FIG. 1, showing the trailer pulling apparatus in an alternate configuration.
Figure 4:
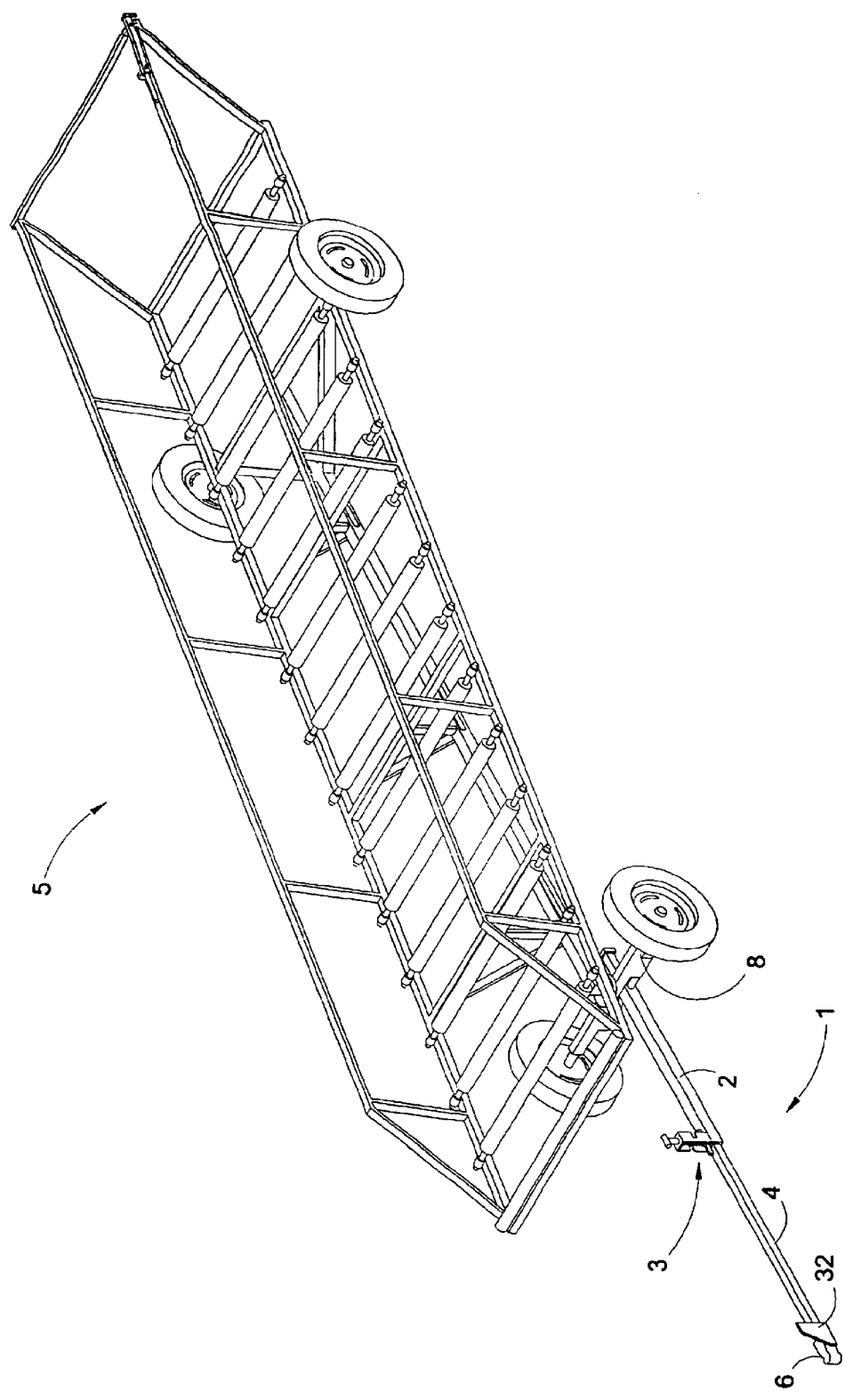
FIG. 4 redepicts the trailer pulling apparatus showing the apparatus operatively attached to an exemplary fifth wheel hay carrying trailer, such trailer being of the type described in U.S. patent application Ser. No. 10/610,106, filed Jun. 30, 2003, entitled "Round Hay Bale Carrier".

Referring simultaneously to FIGS. 1 and 4, and assuming that the trailer pulling apparatus 1 and exemplary hay trailer 5 are pulled by a flatbed truck (not depicted) which is equipped with articulating hay bale transferring arms, "T" handle 24 may be grasped by an operator and pulled upwardly against spring 26 until latch arms 28 and 30 align with slots 18 and 16. Thereafter, referring further to FIG. 2, the operator may rotate "T" handle 24 clockwise, causing latch arms 28 and 30 to pivotally move into slots 18 and 16. Upon configuring the trailer pulling apparatus as depicted in FIG. 2, the sliding tongue 4 is released for sliding motion within the bore of quill 2. Thereafter, said truck may be backed toward trailer 5 until pin releasing plate 32 contacts the distal end of latch arm 30, simultaneously driving latch arms 28 and 30 out of slots 18 and 16. Upon configuring the trailer pulling apparatus 1 as depicted in FIG. 3, such truck closely approaches trailer 5, facilitating rearward hay bale transfers from such truck to the trailer. In the configuration of FIG. 3, the lower end of shear pin 22 extends through the quill's pin receiving aperture (not within view) to rest upon the upper surface of slide tongue 4.

After completion of such bale transfers, such truck may be slowly driven forwardly, causing slide tongue 4 to move slidably through the bore of quill 2 until shear pin receiving aperture 34 aligns with the lower end of shear pin 22. At such point, biasing spring 26 drives shear pin 22 downwardly into shear pin receiving aperture 34, relocking the trailer pulling apparatus 1 in the forwardly extended traileering position depicted in FIG. 1. Slide stop 10 serves as a "fail safe" protecting against separation of the slide tongue 4 from quill 2. While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A trailer pulling apparatus comprising:
    (a) a quill having a bore and having an outer surface;
    (b) trailer mounting means fixedly attached to the quill;
    (c) a tongue having a forward end and having a rearward end, the tongue extending through the bore of the quill;
    (d) a hitch fixedly attached to the forward end of the tongue;
    (e) spring Biasing means;
    (f) a pin latch; and,
    (g) slide controlling means fixedly attached to the quill, the slide controlling means being adapted for alternately resisting and permitting sliding movement of the tongue through the bore of the quill; the slide control means comprising a shear pin, a first shear pin receiving aperture, and a second shear pin receiving aperture, the first and second shear pin receiving apertures respectively extending through the quill and through the tongue, the first and second shear pin receiving apertures being alignable and being fitted for receipts of the shear pin; the slide control means further comprising a pin guiding bracket, the shear pin being mounted slidably within the pin guiding bracket for movement between first and second positions, the shear pin extending into the quill's bore while in its first position, the shear pin being withdrawn from the first position while in the second position; the spring biasing means being operatively connected to the shear pin and to the pin guiding bracket, the spring biasing means being adapted for moving the shear pin to the first position; the pin latch operatively spanning between the pin guiding bracket and the shear pin, the pin latch being adapted for releasably holding the shear pin in the second position; and
    (h) pin releasing means fixedly attached to the forward end of the tongue, the pin releasing means being adapted for, upon rearward sliding motion of the tongue through the quill's bore, automatically disengaging the pin latch, freeing the shear pin for spring biased movement to the first position.

2. The trailer pulling apparatus of claim 1 wherein the pin latch comprises a trip arm and slot combination.

3. The trailer pulling apparatus of claim 2 wherein the pin releasing means comprises a trip bar.

4. The trailer pulling apparatus of claim 3 wherein the hitch comprises an eye, ball socket or clevis hitch.

5. The trailer pulling apparatus of claim 4 wherein the quill and the tongue comprise lengths of structural steel having square or rectangular cross-sectional shapes.

6. The trailer pulling apparatus of claim 5 further comprising a slide stop fixedly attached to the rearward end of the tongue.

7. The trailer pulling apparatus of claim 6 further comprising a pull handle fixedly attached to the shear pin.

* * * * *